United States Patent
Bolander et al.

(10) Patent No.: US 7,257,504 B2
(45) Date of Patent: Aug. 14, 2007

(54) PRODUCTION OF RADIO FREQUENCY ID TAGS

(75) Inventors: Jarie G. Bolander, San Francisco, CA (US); Forrest Wunderlich, El Granada, CA (US); Neil Jarvis, Saratoga, CA (US); Christopher J. Lee, Santa Clara, CA (US); Bernard Baron, Mountain View, CA (US); Paul A. Lovoi, Saratoga, CA (US)

(73) Assignee: Tagent Corporation, Sunnyvale, CA (US)

( * ) Notice: Subject to any disclaimer, the term of this patent is extended or adjusted under 35 U.S.C. 154(b) by 0 days.

(21) Appl. No.: 11/145,016

(22) Filed: Jun. 3, 2005

(65) Prior Publication Data

US 2006/0276987 A1    Dec. 7, 2006

(51) Int. Cl.
*H04B 1/59* (2006.01)
*H04Q 5/22* (2006.01)

(52) U.S. Cl. ............... 702/106; 340/10.52; 702/85; 702/72; 702/75; 324/763; 324/764; 324/76; 438/14; 438/17; 438/18; 455/41.2; 455/151.2

(58) Field of Classification Search ............... 702/106, 702/75, 35, 36, 81, 84; 324/763, 764, 76; 438/14, 17, 18; 455/41.2, 151.2
See application file for complete search history.

(56) References Cited

U.S. PATENT DOCUMENTS

| 5,838,163 | A | * | 11/1998 | Rostoker et al. ............ 324/763 |
| 6,480,699 | B1 | | 11/2002 | Lovoi |
| 6,825,683 | B1 | | 11/2004 | Berndt et al. |
| 2003/0112128 | A1 | * | 6/2003 | Littlechild et al. ........ 340/10.52 |
| 2005/0121898 | A1 | * | 6/2005 | Laackmann ................. 283/70 |
| 2006/0125507 | A1 | * | 6/2006 | Hyde et al. ................. 324/765 |

* cited by examiner

*Primary Examiner*—John Barlow
*Assistant Examiner*—Sujoy Kundu
(74) *Attorney, Agent, or Firm*—Thomas M. Freiburger (57) ABSTRACT

A radio frequency ID tag, very small in size and with an onboard antenna, is manufactured, tested and applied cost-efficiently. The transmit frequency for the tag is set during manufacture approximately, within a selected range, in a gross tuning step. A second tuning step fine tunes each tag by RF communication to set values of capacitance, resistance, etc., and this can be at the point of application of the tags. Other aspects include burning a randomly-selected value in the RF ID chip during manufacture to impose a random time delay for tag response (rather than having a random generator on the chip itself); structural testing of a large number of tags on a wafer using on-wafer interconnects and a special onboard sequencer test die; and production of the tag so as to be tunable to different frequency ranges.

16 Claims, 6 Drawing Sheets

PRODUCTION OF RADIO FREQUENCY ID TAGS

BACKGROUND OF THE INVENTION

This invention concerns radio frequency identification tags to be used as identifiers and for counting and inventorying articles and containers of articles. In particular, the invention concerns a miniature RF ID tag generally of the type disclosed in U.S. Pat. No. 6,480,699, which is incorporated herein by reference.

Radio frequency ID tags have been described in various forms, and designed for various purposes. The type of ID tag to which this invention is concerned essentially comprises an integrated circuit with an antenna onboard the chip, and with an energy store which will capture a portion of the RF energy from an interrogator unit, store that energy and use it to power a responding signal transmitted from the tag, as in U.S. Pat. No. 6,480,699.

Currently, in the manufacture of semiconductor devices (for a variety of different purposes, not only ID tags) dice are tested by connecting each die individually with a tester. This typically occurs while the dice are still on the wafer and also after each die has been cut from the wafer and assembled, and it is a costly procedure.

In addition, present semiconductor devices typically are pre-tuned by automatic testing equipment (ATE) during a manufacturing test. Such devices are often tested/tuned numerous times in both the wafer stage (before packaging) and in a final test (wherein the device is packaged). To eliminate any high variation in the manufactured devices, a fairly expensive process with narrow tolerances is required for the initial tuning. Most fine tuning of semiconductor devices cannot make adjustments over a wide enough range to overcome the initial production offset, unless ATE type pre-tuning has been performed. There is a need for a less expensive regime for tuning of semiconductor devices to target values, particularly in the production of RF ID tags. ATE type testing is expensive and its avoidance is an object of the invention. It would be desirable to perform as much testing of RF ID tags as possible at the time of application of the tags, rather than during manufacturing, although an efficient parallel test for manufacturing defects would also be desirable at the time of manufacture.

In RF ID tags, of the type described in U.S. Pat. No. 6,480,699 wherein an onboard power supply stores energy from an interrogating signal, the responsive tag transmission in many applications must occur in a specific time slot which is distinct from the transmit time slots of all other tags similarly situated. This is needed for collision avoidance, that is, simultaneous responsive transmissions from multiple tags. This is true for applications in which a large number of items are to be detected, counted, tracked and/or identified, since the reader needs to detect or count or track or identify every individual item. U.S. Pat. No. 6,480,699 described a method to reduce data transmission collisions from RF ID tags by having each tag select a random time slot. This would require each of the tags to have an onboard random number generator as well as supporting digital circuitry to calculate the random time slot in which to transmit. It would further economize the production of semiconductor RF ID tags to eliminate the need for such onboard random number generators and supporting circuitry, by imposing a random time slot on each tag in a different way.

Different nations of the world have different regulations regarding frequency bands for radio frequency devices. This requires RF ID tags to be tuned differently for different jurisdictions. It would be efficient and highly desirable to be able to produce a single form of tag which is tunable to an appropriate frequency for the requirements of all applicable jurisdictions. In addition, even within a single jurisdiction, different frequencies are often needed for different applications, within the same facility, for reasons relating to interference and false readings for different products or applications. A tunable tag, tunable by the user at time of application, would allow for the production and inventorying of only one type of tag, again saving cost and increasing efficiency.

The following U.S. patents have relevance to the invention described below: U.S. Pat. Nos. 6,480,699 and 6,825,683.

It is among the objects of the invention to address the needs described above. These and other objects, advantages and features of the invention will be apparent from the following description of preferred embodiments, considered along with the accompanying drawings.

SUMMARY OF THE INVENTION

Pursuant to the invention now described, a radio frequency ID tag, very small in size and with an onboard antenna, is manufactured, tested and applied cost-efficiently. The transmit frequency for the tag is set during manufacture approximately, within a selected range, in a gross tuning step. The gross calibration, which might be within a range such as about 105% of the target transmit frequency for the tag, is based on one or more measured characteristics of electronic componentry on wafers, as based on such measured characteristics, the chips can be grossly calibrated in parallel so that all tags will be within a fairly close tolerance of the target transmit frequency. A second tuning step fine tunes each tag by RF communication to set values of capacitance, resistance, etc., and this can be at the point of application of the tags.

Other aspects of the invention are testing of transmit response, signal strength, and other performance issues at the time of application of the tags to products or containers, rather than during manufacturing; burning a value in the RF ID chip during manufacture, the value being randomly selected and then applied to the chip to impose a random time delay for tag response (rather than having a random generator on the chip itself); structural testing of a large number of tags on a wafer using on-wafer interconnects and a special onboard sequencer test die; and production of the tag so as to be tunable to different frequency ranges, such tuning to be done either at subsequent testing or during tag application, to accommodate different jurisdictional frequency requirements. All of these production and testing features add to economy of producing the tag and reliability of the tags in service.

DESCRIPTION OF PREFERRED EMBODIMENTS

Figure 1:
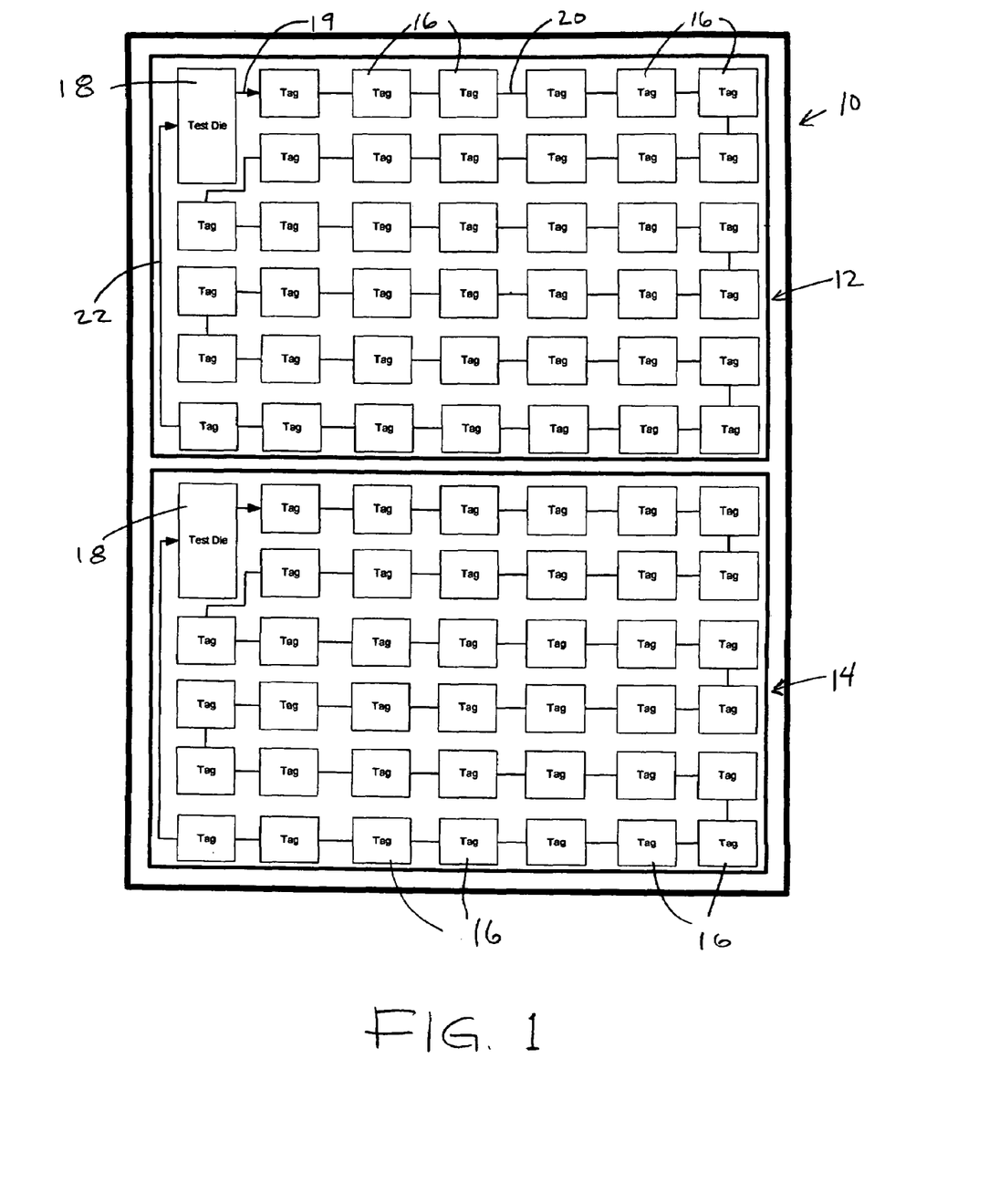
FIG. 1 is a schematic diagram showing a multiplicity of RF ID tags as produced on a wafer, the wafer including a special test sequencer die serially connected to a large number of tags, so that a large group of dice can be tested while still on the wafer.

FIG. 1 shows the reticle field of a semiconductor wafer 10 in the manufacture of RF ID tags, in accordance with one aspect of the invention. In each of two sections 12 and 14 of the wafer, a multiplicity of tag dice 16 are connected in series to a test die 18 for that section. The number of tag dice will be dependent on the size of the tags 16 and the test die 18. The interconnection of all tag dice to the test die in the reticle field enables a tester to make contact only with the test die 18 in order to test all interconnected tag dice within that section of the wafer, without requiring that a probe make contacts with each individual tag dice 16. As indicated, a series of conductors 19 and 20, respectively (each of which may be a bus), connect the test die 18 to the first tag die 16 and the tags serially one to the next, so that through the tags, the test die 18 can connect to each one of the tag dice serially. All tag dice, and the test die 18, can be connected while on the wafer to a common ground.

As indicated in the drawing, on a wafer 10 there are multiple sets of connected dice 16 and test die 18, two in the illustrated case. There could be more sets, or more or fewer tag dice within each set.

The test performed by the test die 18 is essentially a basic electrical test. The test checks to see if components on the chip are connected properly and functioning properly (i.e. correct logic function, correct bias currents and correct voltage levels). When the test die is connected via a probe pad or pads exposed on the wafer, to a prober of a testing device, a test sequence begins. The first tag die 16 in line is tested first, and its location is known by keeping track of the sequence of tests in the testing device. Once the test results are obtained for the first tag 16, a register included in the tag die is shifted such that the next test will be shunted through the first tag die to test the second tag die. This sequence continues until all dice 16 within the set of connected dice have been tested. The results, reported to the tester, are used to identify which tag dice to discard when the individual tags are cut from the wafer 10.

In a preferred embodiment, the test die in each connected set of dice serves as the master control for testing of the tag dice. The test die provides all of the control signals to each tag die in order for testing to begin, i.e. it controls all interactions with the tag under test, launches testing and gathers status on each tag. It also provides analog input voltages to allow for trimming, that is, the test die will generate certain voltages that will bias certain tag circuits correctly. The circuits will then be tested and the results compared to what they should be. The voltage can then be varied to see the effect.

The test die enables each die one by one by shifting in a select value down the shift register chain to the die it wishes to test. Once enabled, the test die issues commands to the tag under test and receives responses. These responses can be the successful setting of a memory element (say an ID register) or the measurement of a bias voltage (like a band-gap voltage reference).

Once the tag has been tested, the test die sets the good tag register element if the tag is test good. The test die then shifts the enable bit to the next tag and the testing repeats until all tags are tested. A return line shown at 22 from the last tag die back to the test die 18 provides a return path or a check that all tags have been tested. The test die communicates to the tester which dice are good and which are bad, and these data are then stored in a database for each lot and wafer. Only the good dice are chosen from the wafer.

In a similar embodiment of the invention, all tags are enabled for testing and testing commands are sent to all tags. The tags perform the tests and store the testing results in a memory element. The test die then sequentially shifts the enable bit through each tested tag to determine its status. The test die then writes a memory element to signify that the tag was tested and whether it passed or failed. The test die then shifts the enable bit to the next tag and the query starts over again. This embodiment allows for the parallel testing of tags to reduce testing time.

This test system differs from prior practice, in that typically (in the case of any integrated circuit dice, not necessarily RF ID tags), the tester must probe contacts on each individual IC, while still on the wafer. In the case of U.S. Pat. No. 6,825,683, an increase of testing efficiency was disclosed by testing multiple integrated circuits that are in the same package, whereas by the present invention, multiple ICs are within the same wafer.

Figure 2:
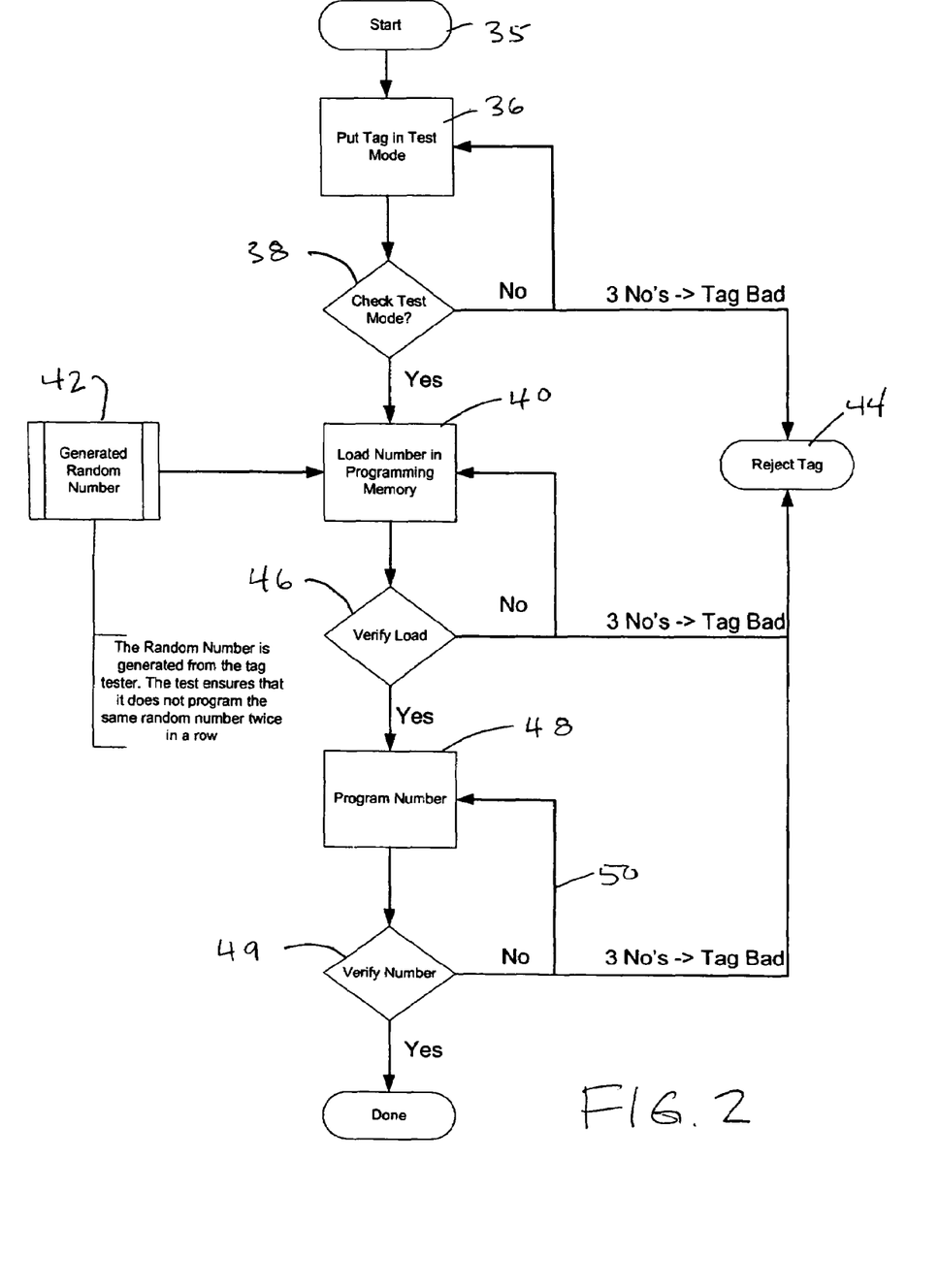
FIG. 2 is a schematic flow chart representing a procedure for imposing a random or pseudo-random transmit time delay number on each of a plurality of RF ID tags.
Figure 3:
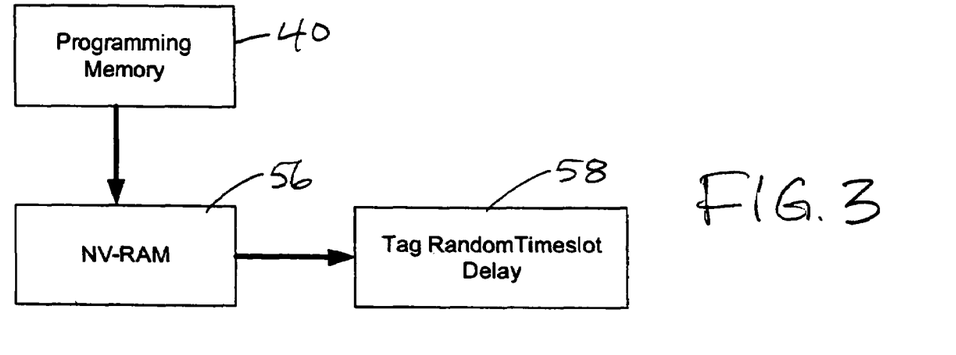
FIGS. 3 and 3A are a simple schematic flow chart and a simple schematic diagram indicating one procedure and mechanism for setting a random transmit time delay on an RF ID tag.
Figure 3A:
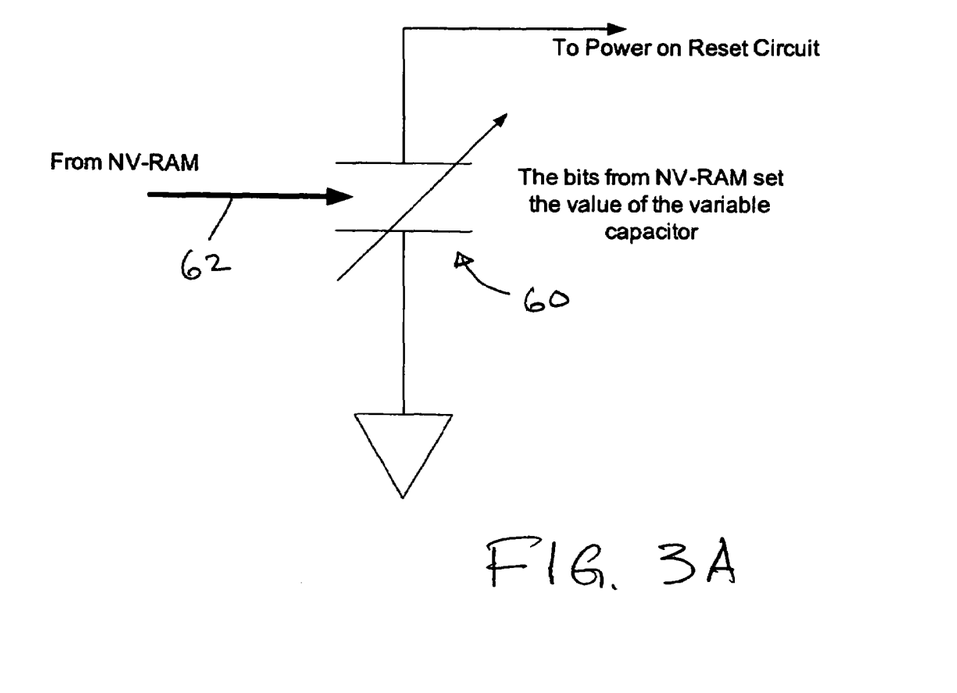

FIGS. 2, 3 and 3A show another aspect of the invention, a procedure and mechanism for imposing a randomized transmit time delay on each RF ID tag of a large multiplicity of such tags, so that each tag responds to an interrogator in a different time slot, to prevent interference in receipt of the responses. By the invention a permanent value is placed in nonvolatile RAM (NVRAM) or a series of fuses in a fuse bank are blown on the tag to select one of the microsecond time slots that the RF ID tag will use to transmit its data. If desired two different time slots can be placed on each tag, to allow for an alternative so that if it happens that two tags have the same random number defining the time slot, this will be detected by the interrogator of the tag as a collision and in a second reading by the interrogator, the tag will shift to the second time slot and will then be counted distinctly from the other tag. The interrogator can be set up to do two reads each time, with each tag having a register that shifts between its two random delays with each transmit. Since the interrogator system does multiple readings to determine the tags in its field, additional collisions of different tags will be post-processed out by looking at the superset of read tags. In the illustrated embodiment the random time delay is imposed using NVRAM. As noted above, the invention avoids the need to include a random number generator in the IC of the tag, potentially saving size, cost and power requirements for the tag.

FIG. 2 indicates that after START, at 35, the manufactured RF ID tag is put in test mode, at 36. This can be a test as described above in connection with FIG. 1, or the test could be done otherwise, but it is a test performed of IC components and integrity, using a tester probe. As indicated in the flow chart of FIG. 2, if the test mode results are good, as determined in the decision block 38, then a number is loaded in the programming memory, i.e. the NVRAM of the chip of the tag, as indicated in the block 40. As the drawing also shows, the random number, indicated in the block 42, preferably is generated by the tag tester, that is, the tester that performs the test in the blocks 36 and 38. The number is not truly random, but rather is a "pseudo-random" number, since it is generated by an algorithm, but such a number is sometimes referred to herein as a "random" number.

At the decision block 38, if the tag circuitry does not check positive, then flow reverts back to the block 36 and the tag is rechecked. If bad readings are determined three times, the tag is considered a reject, as in the block 44.

After the number is loaded in programming memory, the successful loading of the number is checked, see the decision block 46. If the check is negative, the loading of the number is performed again, and verified again. If verification gives a negative result three times, the tag is considered bad and is rejected, as in the block 44. If the loading of the random number is verified, then the procedure flows to the block 48, where the actual ID is programmed into the NVRAM. This process is done to reduce test time since if the number cannot be loaded into the programming RAM, it makes no sense to program the tag. Again, a verification routine is performed, indicated by the block 49 and the loop 50.

FIGS. 3 and 3A show some of the mechanism for imposing the randomized time delay number onto the RF ID tag chip. Again, FIG. 3 shows the programming memory at 40, and indicates transfer of the random number for transmit time delay to NVRAM 56, resulting in the installation of the tag random time slot delay, indicated at 58. The IC of the tag includes a variable capacitor 60, and FIG. 3A indicates, at arrow 62, the random number being transferred from NVRAM to the variable capacitor. The bits from NVRAM set the value of the variable capacitor. The variable capacitor goes to the POR (power on reset) circuit and sets the time constant for when the POR deasserts. This allows the rest of the tag circuit to operate as designed. This is how each tag comes out of POR at a random time.

As indicated above, this embodiment shown in FIGS. 3 and 3A is one example of the implementation of a randomized transmit time delay slot to be imposed on the tags, such that each tag responds at a different microsecond time slot from all others. This could also be accomplished with a series of fuses in a fuse bank, wherein selected fuses are blown in the tag circuitry to designate a time slot in accordance with a pseudo-random number imposed on the chip. Such circuits, modifiable after manufacture, are well known to those skilled in the art.

Figure 4:
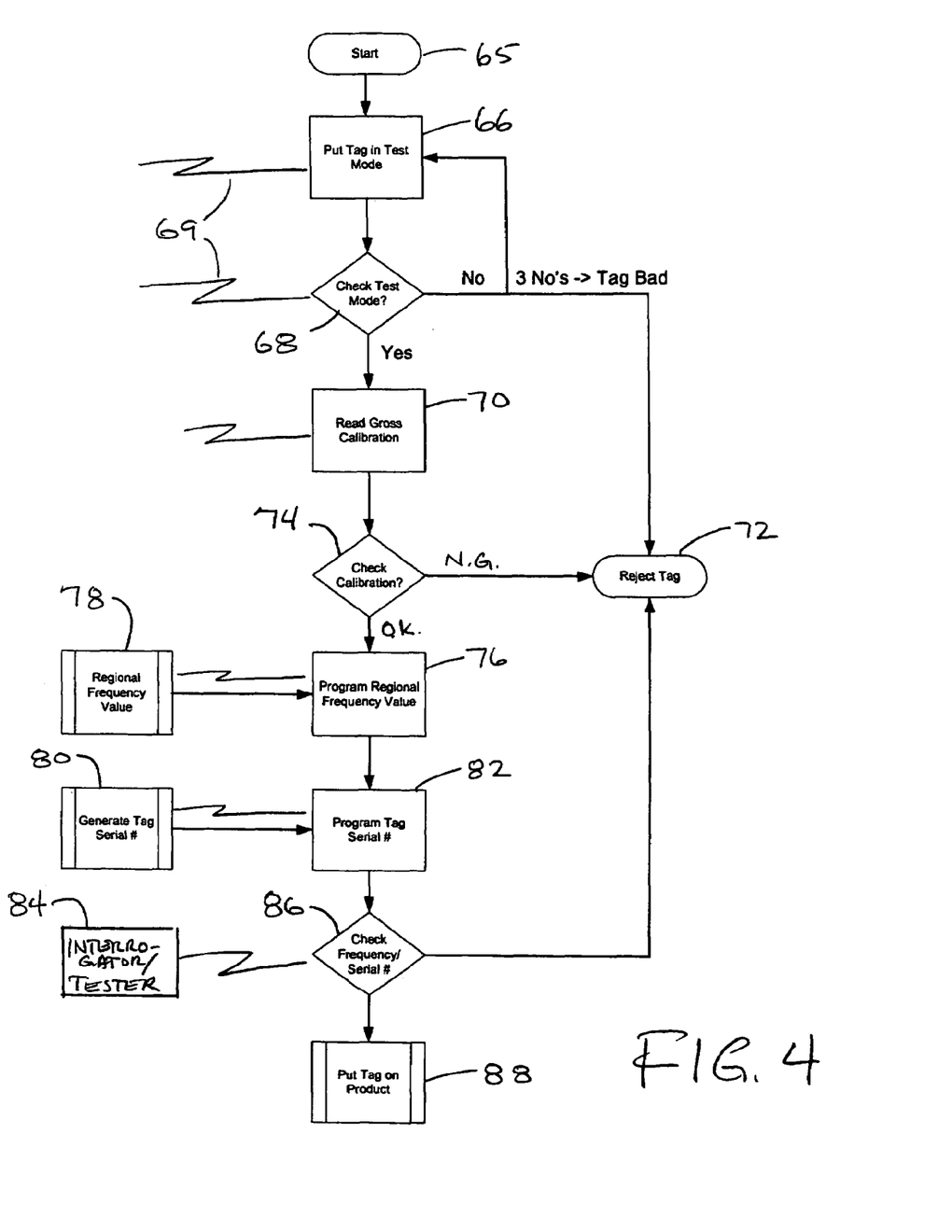
FIG. 4 is a flow chart indicating procedure for testing an RF ID tag at the point of application by RF communication.

FIG. 4 shows in schematic flow chart form a procedure for testing of tags at the point of application of the tags to merchandise, containers, etc., rather than testing for certain parameters and functions during manufacture.

From the start 65 of the procedure, the RF ID tag is put in test mode, as in the block 66. This is after manufacture of the tag, and will typically be after structural and integrity testing of the components and circuitry as discussed with reference to FIG. 1, above. Limited probe testing of the tag dice normally will be required, at least until yields are high enough to eliminate all such testing. The probe testing can be done by random sample selection rather than testing every die. In the test mode, the RF ID tag is at the customer, and is tested at the time of application of the tag to merchandise, containers, etc. Tags are tested via RF communication. The tags are tested one by one for various features that can be checked via the transmitted RF response from the tag to the interrogator. The test can include signal strength of the transmitted response, the RF spectrum of the response and center frequency of the response, various currents and voltages on the tag (digital representations of such signals) and tag response to varying power and data signal strengths (to the tag).

In the flow chart, decision block 68 indicates the first check of the tag, to determine whether anything has happened to the tag, i.e. that first it is in test mode and has not been damaged. If the response is o.k., the chart indicates proceeding to read gross calibration at 70.

If the tag does not respond to the test 68, or if the response is so far from standards as to make the tag unacceptable, the test is repeated several times, and three negative results lead to rejection of the tag, as at 72. RF communication symbols 69 indicate over-the-air communication, which is used for all tests in FIG. 4. Reading of the gross calibration at 70 is to ensure that the tag was tested at the wafer level and that it is a "good" tag, as per the decision block 74 that follows. If the tag checks within calibration limits at 74, the flow proceeds to imposing a regional frequency value on the tag, assuming this is to be done, per the block 76 (if the tag checks outside acceptable limits, it is rejected, at the block 72). Such a regional frequency value can be put on the tag if, as discussed above, the tag is programmable to a different transmit frequency to comply with standards and regulations of different jurisdictions. Thus, a regional frequency value is indicated in the block 78, and this is a value that is set in the interrogator/reader at the facility of the tag user/customer. By RF communication the reader sends the regional frequency value to the tag and, by any of several methods known in the art, the tag circuitry accepts this RF-transmitted value and adjusts the transmit frequency of the tag accordingly. This is discussed further with regard to FIG. 6, below.

Once the regional frequency value has been set in the tag (block 76), the procedure goes to the blocks 80 and 82, whereby a tag serial number is generated by the interrogator/tester and is sent again by RF communication and the tag's antenna, to the tag, as indicated at 82. The tag is now programmed with a specific serial number as an identifier at the facility where the tag is to be applied. The tag is then checked by the interrogator/tester, as indicated at 84 and the decision block 86. This test includes both the transmit frequency of the tag, to check for the correct regional frequency as set at 76, and a check for the correct serial number to be contained in the transmitted response from the tag. If these are correct within limits, the tag is then applied to a product or a container, as indicated in the block 88. If either the frequency or the serial number is not correct, or is outside tolerance limits, the tag is rejected.

Figure 5:
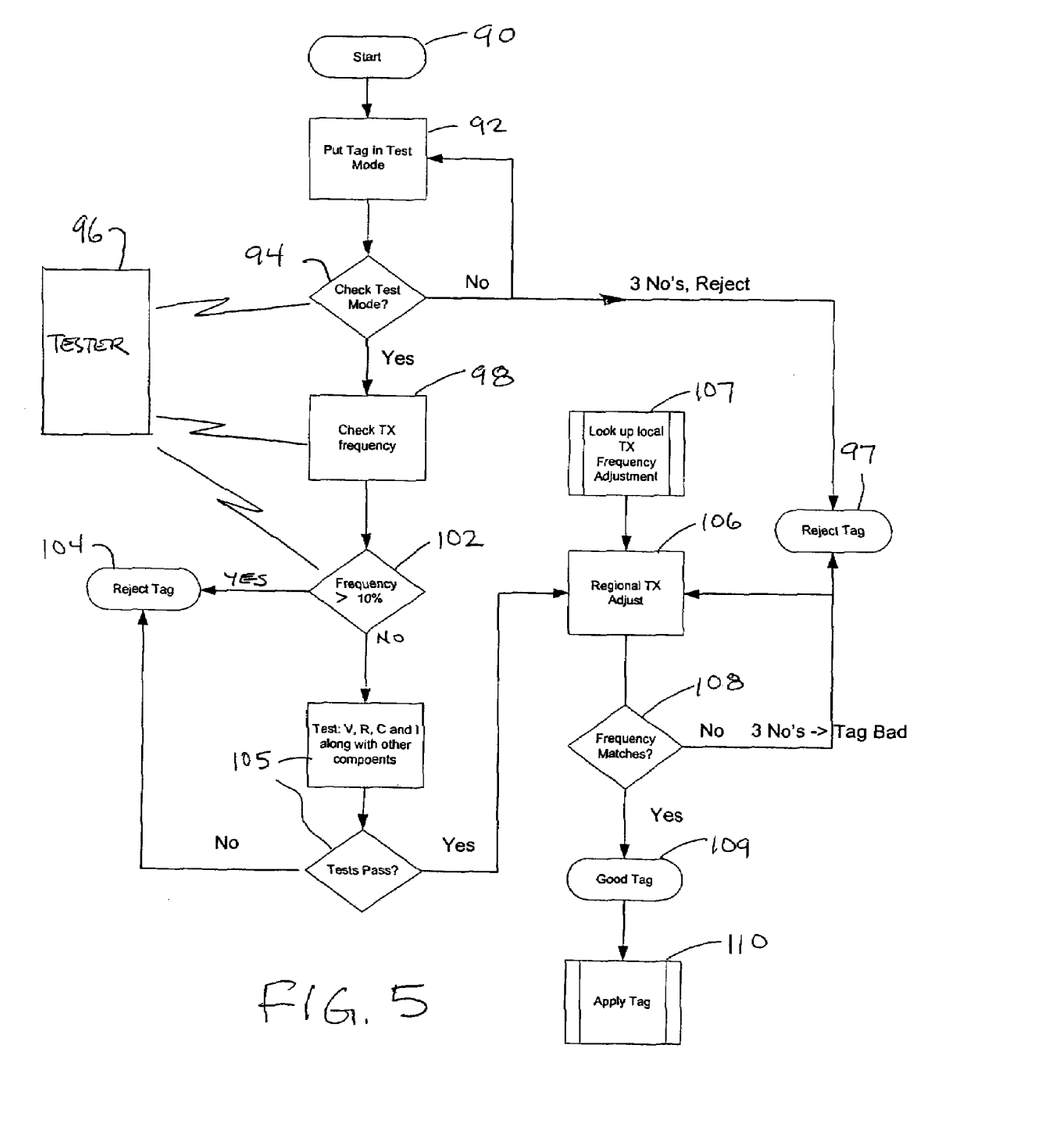
FIG. 5 is another schematic flow chart, in this case illustrating procedure in an aspect of the invention whereby RF ID tags are checked at the point of application of the tag by RF communication with a tester/applier, and by which transmit frequency of the tag is adjusted by "tuning" the tag's transmit frequency through the RF communication with the tester.

FIG. 5 is a flow chart indicating another aspect of the invention. This procedure relates again to the transmit frequency of the RF ID tag. The procedure outlined in FIG. 5 is a two-step calibration. The main purpose of the process is to allow for process variations on the wafer, where the RF ID chip is manufactured. In manufacture of the tag chip on the wafer, the transmit frequency for all tag dice is set roughly, allowing for considerable variation, such as within about 10% of the desired center frequency. This allows for less precision in manufacture, with the tags manufactured so as to be calibratable later. In manufacture, some characteristic of the process of a component is measured, a characteristic that affects transmit frequency. Using this characteristic, the chips are all roughly tuned together in the testing phase during manufacture, such as using a process described relative to FIG. 1, above. All chips are tuned together. Such a characteristic could be the threshold value of a transistor, the capacitance of a capacitor, or drive current of a transistor. Based on the determined value, adjustments can be made during testing so that all tags are roughly tuned, within loose limits. This procedure occurs at manufacture, and is not indicated in the flow chart of FIG. 5.

Then, at the point of application of the tags to merchandise or containers, switches can be set in capacitance, resistance or current drive, to fine tune the calibration of each tag individually. This is done over the air, with RF communication, to set bits in the tag circuitry. This fine tune step is validated at the time of tag application by the tag application machine by monitoring the response of the tag and transmitting to the tag within the gross frequency range.

The process is schematically represented by the flow chart of FIG. 5. After start of the process (90), the tag is put in test mode, 92. A check is performed to verify the tag has not been damaged and has entered test mode, at decision block 94, and this is at the point of application, i.e. when the user of the tags is about to apply them. As with all other tests in FIG. 5, the test is performed over the air, as indicated at 96. If the tag checks at this preliminary test, i.e. the tag does respond within broad limits, the process proceeds to check the transmit frequency, at 98. If no, a recheck is done, and if no three times, the tag is rejected as at 97. The check of frequency 98 is done over the air, and if the transmit frequency deviation is outside a prescribed gross frequency limit, as at decision block 102 (which, for example, is shown as 10%), the tag is rejected as indicated at 104. If the result is "no" at the decision block 102, the tag transmit frequency is not outside prescribed limits, and the tag can be subjected to further testing at 105. This can include, for example, tests of current, voltage, capacitance and resistance of components. The tag circuit can have an onboard test component to self-test these parameters using power stored from the interrogating signal, and can produce digital representation of the values for voltage, current, etc. The digital parametric representations can then be transmitted over the air to the tester, with rejection of a tag if values are outside acceptable limits.

If the tag is o.k., it can be tuned for use and applied, or it can be tuned for a particular regional transmit frequency requirement (as in FIG. 4), the regional adjustment being shown at 106. This assumes that all jurisdictions of interest have frequency band requirements that are within the tunable range of the tags as manufactured.

At the block 106, the feedback of transmit frequency, from the test indicated at the decision block 102, gives an error or deviation in transmit frequency. This is error is used by the interrogator/tester 107 to look up an appropriate correction to bring the transmit frequency to the correct value. Over the air, the correction value or adjustment value is sent to the tag at 106, for adjustment of the transmit frequency to the regional requirement, which can be through programmable NVRAM or by switches on the tag, fusible links, storage cells, etc. The tag is then tested, again over the air, for the corrected transmit frequency, as indicated at the block 108. If the result is correct within limits, the tag is good (109) and is applied to a product, block 110. If not, the tag is put back through the loop to the blocks 102 and 106, and rejected if failures are repeated.

Figure 6:
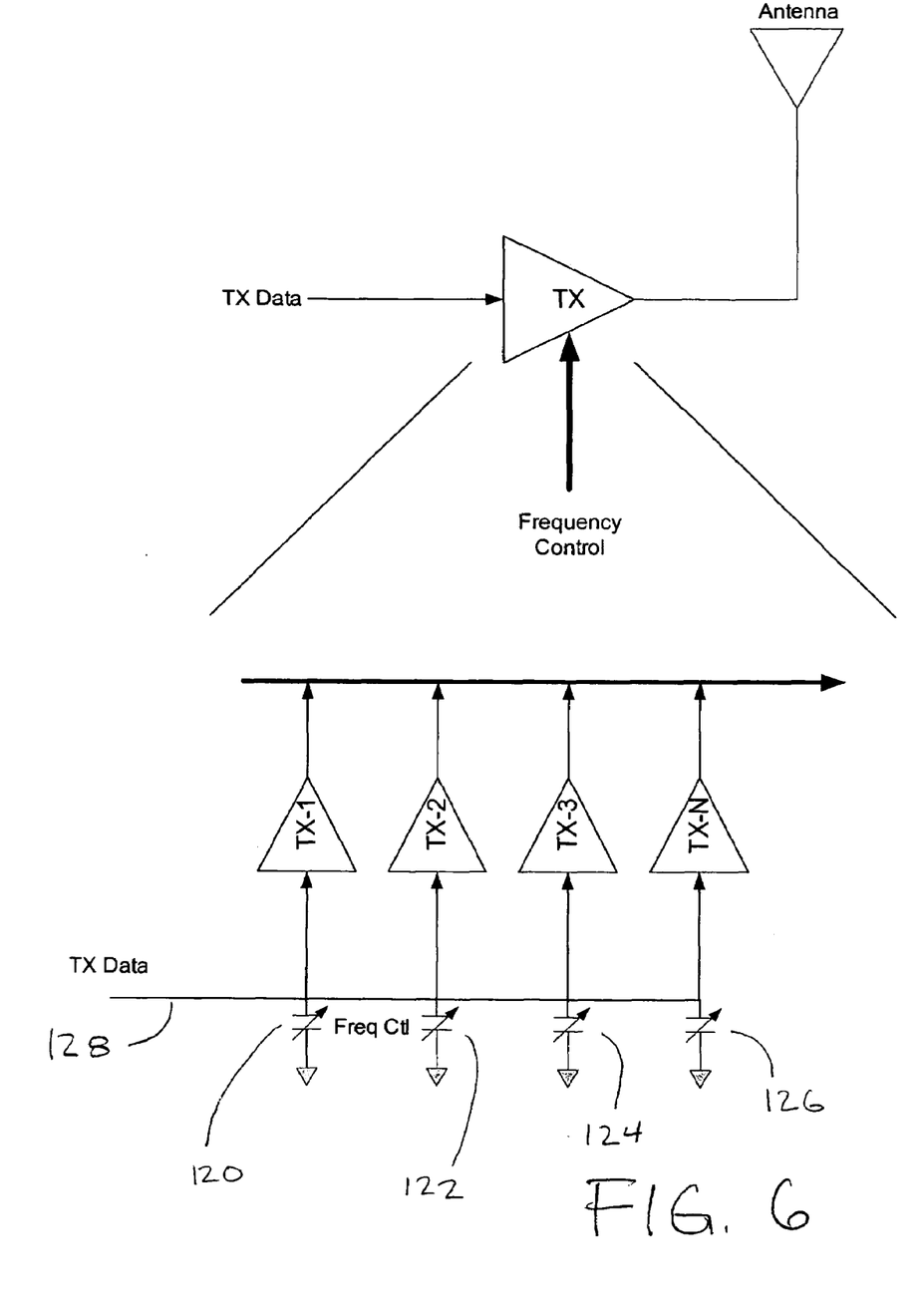
FIG. 6 is a schematic diagram indicating an aspect of the invention by which an RF ID tag is tunable after manufacture, by RF communication, to meet frequency requirements for different jurisdictions.

FIG. 6 schematically indicates one example of circuitry for adjustment of frequency in accordance with jurisdictional requirements, which was indicated as several steps in the procedural block diagram of FIG. 4 and also FIG. 5. The tag transmitter has several control elements (i.e. at least four) that set the pulse shape to adjust frequency according to the jurisdiction requirements. This is accomplished by tuning variable capacitors 120, 122, 124, 126, etc. on the data delay line 128. The delay line will delay the transmit data from exciting the pulser as to shape the waveform the appropriate way for the jurisdiction. These individual pulsers combine in constructive and destructive ways to give the desired pulse shape dependent on the values of their variable capacitors. This time-driven adjustment will change the transmit frequency. As noted above, other transmit frequency adjustment methods can be used, including programmable NVRAM, switches, fusible links, storage cells or other techniques and circuitry known to those skilled in the art.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. In the production of an RF ID tag that receives and stores energy from an interrogator signal and sends a responsive signal on a transmit frequency back to the interrogator, a method for efficiently tuning and assuring accuracy of the tag's transmit frequency in responding to an interrogator, comprising:

in manufacture of a series of tags on a wafer, only roughly setting the transmit frequency to a gross frequency range for all tags, by measuring a characteristic of a circuit component in the tag that affects transmit frequency and roughly tuning based on this characteristic in a testing phase of manufacture, at the point of application of the tags to products or product containers, fine tuning each tag's transmit frequency over the air by sending an interrogating signal within the gross frequency range to the tag and detecting a response from the tag, measuring the frequency of the response, determining a frequency adjustment amount for each tag, and sending a further signal within the gross frequency range to each tag to set bits in a non-volatile element of the tag circuitry to adjust the tag substantially to the desired tag transmit frequency, and applying a plurality of the tags to products or containers, at the point of application.

2. The method of claim 1, including, after fine tuning of a tag substantially to the desired tag transmit frequency, retesting the tag over the air by sending a signal via the interrogator and measuring a responding signal transmitted from the tag, to determine whether the tag has been correctly tuned to the desired transmit frequency, and if not, again determining a frequency adjustment for the tag and sending a further signal to the tag to reset bits in the tag circuitry to achieve substantially the desired tag transmit frequency.

3. The method of claim 1, wherein bits set in the non-volatile element control adding or subtracting capacitance or resistance to obtain the correct frequency.

4. The method of claim 1, wherein the gross frequency range within which the tags on the wafer are roughly set is approximately within 10% of the desired tag transmit frequency.

5. The method of claim 1, wherein, at the point of application of the tags, if the interrogator detects a response from a tag indicating that the tag's transmit frequency is more than 10% deviant from the desired transmit frequency, the tag is rejected as a failure and discarded.

6. The method of claim 1, wherein the step of fine tuning each tag's transmit frequency comprises, at the point of application of the tags, selecting a tag transmit frequency in accordance with regional frequency requirements for RF ID tags at point of application, and, when determining the frequency adjustment amount, measuring the difference between the frequency of the tag's response and collected regional frequency.

7. The method of claim 1, further including, after fine tuning of a tag, applying a serial number to the tag over the air.

8. The method of claim 7, wherein the serial number is transmitted to the tag via an RE link and stored in a non-volatile element.

9. The method of claim 1, further to applying each tag, testing for additional parameters in the integrated circuit of the tag, by over-the-air testing.

10. The method of claim 9, wherein the additional parameters include at least some of the parameters voltage, current, resistance and capacitance of circuit components.

11. The method of claim 9, wherein the additional testing is performed by test circuitry included in the tag integrated circuit, which tests the additional parameters onboard the chip using power from an interrogating RF signal from a tester, the integrated circuit including means for producing digital representations of values for the tested parameters and transmitting the digital representations over-the-air to the tester.

12. A method for producing and testing a multiplicity of integrated circuits, comprising:
forming a multiplicity of integrated circuit dice on a wafer,
forming a test die on the wafer and connecting the test die to all integrated circuit dice,
testing all integrated circuit dice by connecting a tester to the test die while all dice remain together on the wafer, and addressing each integrated circuit die via the test die by issuing commands to each die under test and receiving responses for each die relative to parameters of the integrated circuit to be tested,
gathering test result information for the integrated circuit dice in the test die and the tester and using that information, discarding bad integrated circuit dice on trimming the integrated circuit dice from the wafer, and
wherein the test die enables all integrated circuit dice for testing simultaneously and sends testing commands to all integrated circuit dice simultaneously, each integrated circuit die having a memory element and each die performing the desired tests and then storing the test results in the memory or register element, and including the test die's then sequentially shifting an enable bit through each tested integrated circuit die sequentially to read status of that die, then the test die's writing a memory element on the die under test to signify that each particular die was tested and whether the die passed or failed, for subsequent determination or to whether the die is to be used.

13. The method of claim 12, wherein the integrated circuits comprise RF ID tags.

14. In the production of an RF ID tag that receives and stores energy from an interrogator signal and sends a responsive signal on a transmit frequency back to the interrogator, a method for efficiently tuning and assuring accuracy of the tag's transmit frequency in responding to the interrogator, comprising:

(a) for an initial period of production of RF ID tags, as each of many series of tags is produced on a wafer, roughly setting the transmit frequency of each tag to a gross frequency range for all tags, by measuring a characteristic of a circuit component in the tag that affects transmit frequency and roughly tuning based on this characteristic in a testing phase of manufacture, (b) at the point of application of the tags to products or product containers, fine tuning each tag's transmit frequency over the air by sending an interrogating signal within the gross frequency range to the tag and detecting a response from the tag, measuring the frequency of the response, determining a frequency adjustment amount for each tag, and sending a further signal within the gross frequency range to each tag to set bits in a nonvolatile element of the tag circuitry to adjust the tag substantially to the desired tag transmit frequency, and (c) applying a plurality of the tags to products or containers, at the point of application;

(d) for said initial period of production of the RF ID tags, monitoring the actual transmit frequency of each tag, or of a sampling of tags or selective wafer probing, as measured at the point of application prior to fine tuning, and using this information, making adjustments to the process of production of the tags on the wafers to improve the accuracy of the transmit frequency toward the desired tag transmit frequency, and continuing to adjust the process of production of the tags until a target percentage is achieved of tags having a transmit frequency within said gross frequency range before any rough tuning of tags during production as in step (a), and (e) after said target percentage has been achieved in the initial period of production of the RF ID tags, discontinuing all testing of tags during the wafer production and relying on the integrated circuitry of the tags as produced, continuing to fine tune the transmit frequency of the tags at the point of application of the tags, with discarding of tags that fail to fine tune to the desired transmit frequency at the point of application.

15. The method of claim 14, further including, prior to applying each tag, testing for additional parameters in the integrated circuit in the tag, by over-the-air testing.

16. The method of claim 15, wherein said additional parameters include voltage, current, resistance or capacitance of circuit components of the tag.

* * * * *